US007319746B2

United States Patent
Le Creff et al.

(10) Patent No.: US 7,319,746 B2
(45) Date of Patent: Jan. 15, 2008

(54) METHOD OF ESTABLISHING COMMUNICATIONS BETWEEN SELECTED USER TERMINALS, USING DEDICATED COMMUNICATION EQUIPMENTS

(75) Inventors: Michel Le Creff, Vigny (FR); Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 121 days.

(21) Appl. No.: 10/553,452

(22) PCT Filed: Apr. 16, 2004

(86) PCT No.: PCT/FR2004/000946

§ 371 (c)(1),
(2), (4) Date: Oct. 17, 2005

(87) PCT Pub. No.: WO2004/095816

PCT Pub. Date: Nov. 4, 2004

(65) Prior Publication Data

US 2006/0285674 A1    Dec. 21, 2006

(30) Foreign Application Priority Data

Apr. 18, 2003  (FR) .................................. 03 04853

(51) Int. Cl.
*H04M 3/42* (2006.01)
(52) U.S. Cl. ................. 379/211.02; 379/199; 379/200; 370/522
(58) Field of Classification Search ........... 379/211.02, 379/199, 200; 370/522
See application file for complete search history.

(56) References Cited

U.S. PATENT DOCUMENTS

| 6,243,398 | B1 | 6/2001 | Petrack |
| 6,324,265 | B1 | 11/2001 | Utas |
| 7,197,128 | B1 * | 3/2007 | Stumm et al. ......... 379/211.02 |
| 2002/0024947 | A1 | 2/2002 | Shem |
| 2002/0187777 | A1 | 12/2002 | Osterhout |

FOREIGN PATENT DOCUMENTS

| EP | 1 093 281 A | 4/2001 |
| WO | WO 00/41406 A | 7/2000 |

OTHER PUBLICATIONS

Henning Schulzrinne, SIP: Cal Setup and Beyond: , Ericsson Signaling Days 2000, 'Online! Nov. 14, 2000, XP002265502.

(Continued)

*Primary Examiner*—Quynh H. Nguyen
(74) *Attorney, Agent, or Firm*—Sughrue Mion, PLLC

(57) ABSTRACT

Each communication terminal of the calling user (Uj-k) is logically connected to a first communication equipment (Sk) and each communication terminal of the called user (Uj'-k') is logically connected to a second communication equipment (Sk'). The combination of these terminals enables a plurality of modes of communication between these two users. If the called user accepts the setting up of a call:
- the second communication equipment (Sk') determines each terminal of the called user that would enable setting up of the requested call;
- the second communication equipment (Sk') then sends the first communication equipment (Sk) a terminal identifier for each terminal thus determined; and
- the first communication equipment (Sk) then selects, from the identifiers of the called user that it receives, at least one terminal identifier, and then initiates the setting up of a call.

37 Claims, 1 Drawing Sheet

OTHER PUBLICATIONS

Vinod K. Bhat: "Voice Over IP—The SIP Way", Technology Review #2001-03/TATA Consultancy Services, 'Online! Apr. 2001, XP002265503.

Johnathan D. Rosenberg et a. "The Session Initiation Protocol (SIP): A Key Component for Internet Telephony", Computer Telephony, Jun. 2000, vol. 8, Issue 6.

* cited by examiner

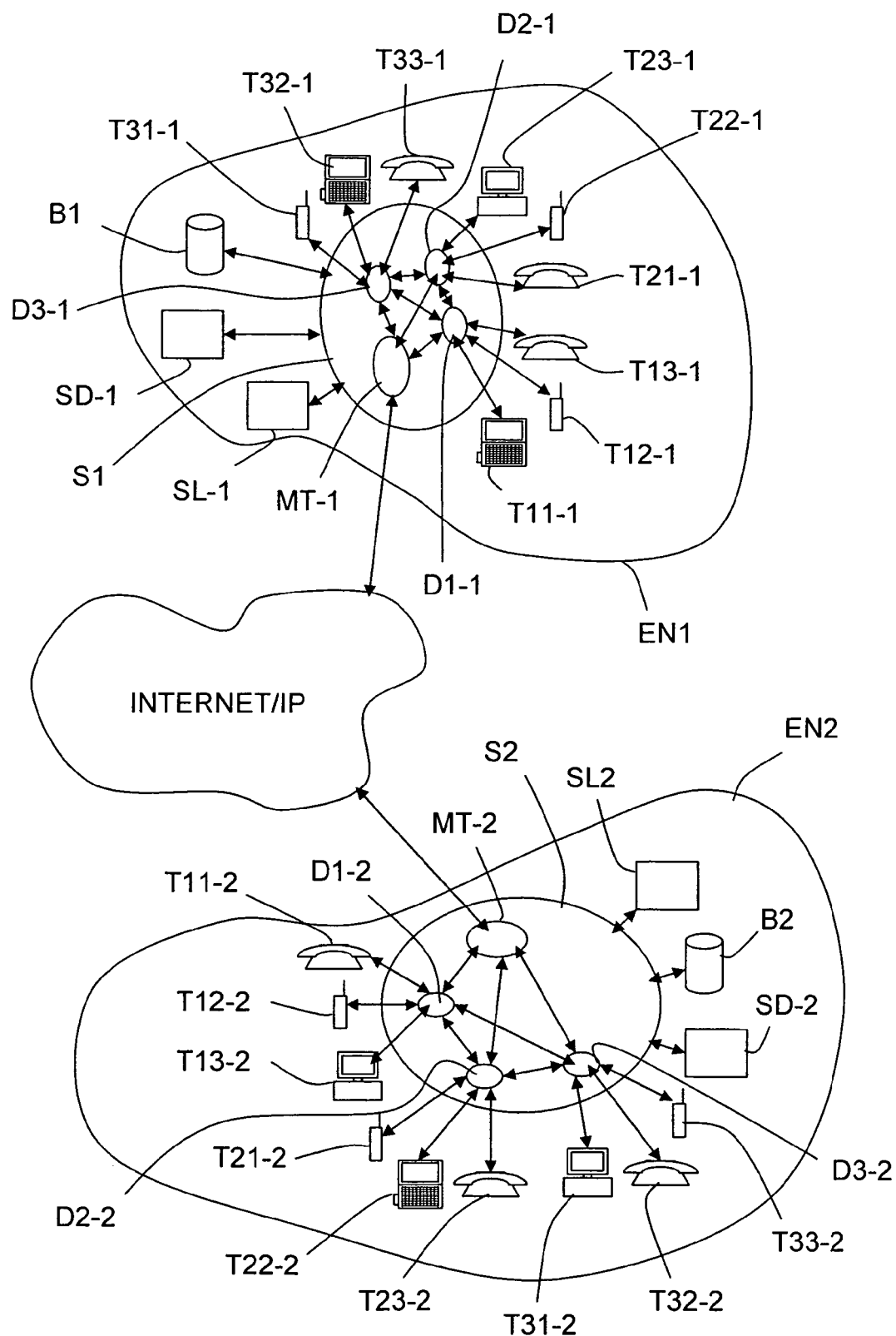
Single figure

METHOD OF ESTABLISHING COMMUNICATIONS BETWEEN SELECTED USER TERMINALS, USING DEDICATED COMMUNICATION EQUIPMENTS

The invention concerns the exchange of data between communication terminals within communication networks, and more particularly setting up calls between user terminals.

In telephony, the ultimate requirement of callers is to be able to contact called parties as quickly as possible, regardless of their respective positions and their respective communication terminals. Now, because of the coexistence of terminals of different types offering services of different types (such as fixed or mobile telephony, Internet telephony, transmission of text, voice, fixed or animated picture data, or multimedia data, for example), and generally connected to networks of different types, and increased personal mobility, setting up a call between a calling party and a called party may prove complex and time-consuming.

In the event of an unsuccessful call attempt, the calling party may be obliged to consult directories and/or to set up one or more calls to determine the communication address of the terminal by means of which he can contact the called party. An unsuccessful call attempt can also oblige the calling party to use a type of terminal other than that originally used. Furthermore, once a connection has been set up between a calling party terminal and a called party terminal, there is no guarantee that the calling party will be able to send data to the called party, in particular if their respective terminals offer services of different types.

To attempt to improve on this situation, it has been proposed to improve call control systems by enabling them to transfer a call to another communication address or to a messaging service or to call the calling party back automatically if the called party is busy. However, these systems do not really take the calling party into consideration and are not adapted to management of mobility and/or the diversity of communication terminal types.

The Session Initiation Protocol (SIP), which is covered by IETF RFC 2543, is described, for example, in the article by Jonathan D. Rosenberg et al. "The Session Initiation Protocol (SIP) A Key Component for Internet Telephony", published in Computer Telephony, June 2000, volume 8, issue 6, page 126.

SIP is used to initiate interactive communication sessions between users and also to terminate or to modify a session. Initiating a session involves determining where the user to be contacted is really located at a given time. A user may have a plurality of telephone terminals situated in different places, for example a personal computer at his place of work, a personal computer at home and an Internet telephone in his laboratory. A call to this user can therefore necessitate causing all these terminals to ring at the same time. Moreover, the user may be mobile. To locate the user, SIP takes account of dynamic location information.

Once the called user has been located, SIP provides a description of the session which the called user is invited to join. For this it can use protocols known in the art: the Multipurpose Internet Mail Extension (MIME) protocol or the Session Description Protocol (SDP). In return, SIP provides the calling user with a response indicating acceptance, refusal, etc.

An application known as the user agent acts in the name of a user. It can act simultaneously as a client (User agent Client) and as a server (User agent Server), respectively when the user sends or receives a session invitation message and when the user responds. This application may be used by two terminals with no intermediate server, but this is generally not the case. The signaling path generally includes a proxy server situated near the calling user and a proxy server situated near the called user, possibly also with a server known as a redirection server.

The calling user uses his client software to initiate a session. This user agent client (UAC) software sends a request (INVITE) to a proxy server situated in an entity near the calling party. The SIP protocol uses universal location addresses known as universal resource locators (URL) very similar to the addresses used for electronic mail. For example, if the electronic mail address of the calling user is jdrosen@dynamicsoft.com, his SIP address is:

sip:jdrosen@dynamicsoft.com

For example, if the user jdrosen wishes to call the user joe@columbia.edu, the terminal of the user jdrosen sends a message INVITE to the proxy server that manages the address domain dynamicsoft.com. This server forwards this message to a redirection server, which manages the address domain columbia.edu. A redirection server is not a proxy server; instead of forwarding the message, it requests the server that sent the message to contact instead a proxy server that it designates, after consulting a database. For example, this database indicates that today Joe is in the domain foo.com. The redirection server then sends to the proxy server of the domain dynamicsoft.com a redirection message requesting it to try again by contacting joe@foo.com. The proxy server of the domain dynamicsoft.com sends a new message INVITE to the proxy server of the domain foo.com, which consults its database and finds out that Joe is in the sales department. It creates a new address: joe@sales.foo.com, and sends a message INVITE to the proxy server of the domain sales.foo.com. The proxy server of the sales department must then forward this message to the personal computer that Joe is currently using.

When Joe has switched on his computer in the sales department, client software executed on that computer creates a link between the addresses sip: joe@sales.engineering.com and sip: joe@mypc.sales.foo.com, by sending a message REGISTER to the proxy server of the domain sales.foo.com. This link is stored, but is periodically refreshed.

In this session initiation example, the proxy server of the domain sales.foo.com consults its location database, which indicates to it the address sip: joe@mypc.sales.foo.com, and then forwards the message INVITE to joe@mypc.sales.foo.com. The message therefore reaches Joe's computer.

Joe responds manually to the effect that he accepts the invitation to join the session, refuses the invitation or is busy, or forwards the message to another address. The response message passes through the same proxy servers as the message INVITE, but in the opposite direction, as far as the terminal of the calling user. The latter responds by means of an acknowledgement and the session is then set up. Voice communication between the two terminals is then set up directly independently of the SIP, for example using the Real Time Transport Protocol (RTP).

US patent application 2002/0187777 describes the use of the SIP to enable a user to send calls to it one at a time to a terminal selected from a plurality of terminals available to it in the same place or in different places. For example, a business user who is visiting a business external to that by which he is employed, and who receives a call request notification on his personal digital assistant while he is in the office of another person in the external business, can request that the call be set up to the telephone of that other person.

The digital assistant is associated with a first proxy server and SIP user agent connected to the same network using the Internet Protocol. When a calling user wishes to set up a call, an "INVITE" text message defined by the SIP standard is sent to the first proxy server. The latter reads a list of numbers at which the called user prefers to be called and selects the first number from that list. The user agent converts this SIP message into another, richer message more suitable for notifying the call invitation to a digital assistant. This other signal may conform to the HTTP or WAP protocol or to the HTML, XML or VOXML language. For example, the digital assistant receives the notification in the form of an HTML web page.

If the called user wishes to set up a call, but on another terminal, he sends a call forwarding instruction and a telephone number (or Internet address) from his digital assistant to the first proxy server. This information is transported in a file that in the present example is also an HTML web page. It is converted by the user agent into a fixed SIP "REDIRECT" message that contains the redirect number. This SIP message is sent to a second SIP proxy server to which is logically connected a second terminal designated by the redirect number. The second SIP proxy server sends an SIP "INVITE" signal to this second terminal. This SIP signal is sent to the second terminal without further conversion if the latter is of the SIP type.

These prior art methods have a drawback in that the called user has many options but the calling user has few options. A calling user does not know what terminals are available to the called user or the preferences of the called user. Consequently, when the calling user wishes to set up a call, he is not able to select a mode of communication as a function of the terminals available to the called user or as a function of the latter's preferences. He can choose only as a function of his own terminals and his own preferences. Moreover, it is desirable for such selection to be effected automatically by an equipment at the service of the calling user.

Thus an object of the invention is to enable a telecommunication equipment at the service of the calling user to select a terminal of the called user (for example a fixed telephone, a mobile telephone, a computer, a personal digital assistant, etc.) and to select a mode of communication (voice only, voice and video, e-mail, "chat", etc.), taking account of information that is enriched compared to that conventionally available to a calling user. This information must not be limited to the terminal type and the mode of communication, because the calling user will often want the terminal and the mode of communication also to be selected as a function of information specific to the called user, for example his availability, location, etc.

A first aspect of the invention is a method of setting up calls between calling users and called users each associated with at least one personal identifier and each having at least one communication terminal, each communication terminal of the calling user being logically connected to a first communication equipment and each communication terminal of the called user being logically connected to a second communication equipment and the combination of these terminals enabling a plurality of modes of communication between these two users;

this method consisting, in the event of a request to set up a call between a calling user and a called user, in exchanging information between the first communication equipment and the second communication equipment prior to setting up a call, and being characterized in that, if the called user accepts the setting up of a call:

the second communication equipment determines each terminal of the called user that would enable setting up of the requested call;

the second communication equipment then sends the first communication equipment a terminal identifier for each terminal thus determined; and the first communication equipment then selects, from the identifiers of the called user that it receives, at least one terminal identifier, if there is a plurality of possible choices, and then initiates the setting up of a call between at least one terminal of the calling user and at least one terminal of the called user corresponding to an identifier that it has selected.

The method characterized as above enables an equipment, when it is at the service of a calling user, to select a terminal to be called from a plurality of terminals available to the called user, since it consists in sending to that equipment a terminal identifier for each terminal enabling the called user to be contacted. The equipment at the service of the calling user then selects, from the identifiers that it receives, at least one terminal identifier of the called user, if there is more than one option.

One particular embodiment of the method of the invention is characterized in that, for each terminal that it has determined, the second communication equipment further determines each communication mode of this terminal, that would enable setting up of the requested call;

the second communication equipment then further sends the first communication equipment a communication mode identifier for each mode determined in this way; and the first communication equipment then selects, from the identifiers of the called user that it receives, at least one terminal identifier and at least one communication mode identifier, if there is a plurality of possible choices.

The method characterized as above enables an equipment, when it is at the service of a calling user, to select a mode of communication in addition to selecting a terminal to be called, if there is more than one option.

A second aspect of the invention consists in a communication equipment for managing the setting up of calls between calling users and called users each associated with at least one identifier and each having at least one communication terminal, this equipment being logically connected to each communication terminal of at least one user and including means for exchanging information with a second communication equipment analogous to the first before setting up a call between a terminal logically connected to this first equipment and another terminal logically connected to this second equipment, this equipment being characterized in that the means for exchanging information with a second communication equipment analogous to the first include:

means for receiving a terminal identifier for each terminal of a called user that would enable setting up of the requested call; and means for then selecting from the identifiers of the called user that it receives at least one terminal identifier, if there is a plurality of possible choices, and then initiating the setting up of a call between at least one terminal of the calling user and at least one terminal of the called user corresponding to a selected identifier.

In one particular embodiment the means for exchanging information with a second communication equipment analogous to the first further include:

means for receiving at least one communication mode identifier for each terminal determined by the second telecommunication equipment; and means for selecting from the identifiers of the called user that it receives at least one terminal identifier and at least one communication mode identifier if there is a plurality of possible choices.

Other features and advantages of the invention will become apparent on reading the following detailed description and examining the appended drawing, in which the single figure is a diagram of one embodiment of a communication installation equipped with communication equipments of the invention. This drawing constitutes part of the description of the invention as well as contributing to the definition of the invention, if necessary.

The embodiment shown in the single figure represents a communications installation including three communication networks of different types interconnected by communication equipments S1 and S2. To be more precise, in this embodiment the installation includes two private subnetworks EN1 and EN2 belonging to a group of businesses (or a company), for example, and coupled to a public data network, for example of the Internet/IP type, via communication equipments S1 and S2.

The communication equipments S1 and S2 preferably have the proxy server function, for example.

The private subnetworks EN1 and EN2 are private automatic branch exchanges (PABX), for example, where applicable of the wireless type (if they conform to the DECT standard). However, they could equally well be wireless local access networks (WLAN).

Although this is not shown, the private subnetworks EN1 and EN2 and the IP data network are also connected by access servers to one or more public telephone networks RTP, for example of the public land mobile network (PLMN) type, such as GSM, GPRS, UMTS and i-Mode networks, or of the switched type, for example the public switched telephone network (PSTN).

Of course, the invention is not limited to this example of a combination of private (sub-)networks (EN), public telephone networks and public data (Internet/IP) networks or to the number of networks selected. There could therefore co-exist a plurality of private networks, a plurality of public data networks and a plurality of public telephone networks (for example of the PSTN or PLMN (in particular GSM, GPRS, UMTS or i-Mode) type).

If authorized to do so, a multiplicity of user communication terminals Tjj-k can connect to a private subnetwork ENk and/or to the telephone network, indirectly to the Internet/IP network via one of the private subnetworks ENk and a telephone network, or indirectly to one of the private subnetworks ENk via the telephone network and the Internet/IP network.

In the embodiment shown, each user Uj-k has three communication terminals Tji-k (a mobile telephone, a fixed telephone and a desktop personal computer (PC) or laptop computer). The suffix i designates the number of the terminal, the suffix j designates the user Uj-k of the terminal and the suffix k designates the subnetwork EN1, EN2 to which the user Uj-k is connected. Consequently, in the embodiment shown, k has the value 1 or 2, j has the value 1, 2 or 3, and i has the value 1, 2 or 3. However, these suffixes could take different values, of course. Thus certain users may have one terminal or two, four or more communication terminals. Likewise, the user number can take any value. Furthermore, the invention is not limited to terminals of the mobile telephone and desktop or laptop computer type alone. It concerns generally any type of communication terminal capable of exchanging data with another terminal, and in particular fixed telephones, personal digital assistants (PDA) and fax machines.

Moreover, desktop and laptop computer type terminals are preferably connected to one of the private subnetworks ENk via connection means, or a network connection, preferably of high bit rate, such as a switched Ethernet connection, for example. However, any other type of network connection may be envisaged, and in particular analog, ADSL, 2B+D, 30B+D, radio, WLAN and Bluetooth connections.

Each user Uj-k is designated by a first identifier, for example, such as a name or a title (e.g. "marketing manager"). First identifiers of different types may co-exist. Moreover, each user Uj-k is associated with a data processing device Dj-k, also referred to as an "assistant". Of course, an assistant D may be associated with a plurality of different users. Moreover, it may equally well be envisaged that one of the users does not have an assistant, the invention then applying provided that at least one calling or called user does have an assistant.

In the embodiment shown in the single figure, all the assistants (devices) Dj-k of the users Uj-k connected to a private subnetwork ENk are installed in the communication equipment Sk, which here acts as a proxy.

Each assistant (device) Dj-k preferably has a proxy function (as defined by the IETF RFC 2871 and RFC ON 2543 standards). Moreover, each assistant Dj-k preferably has a memory (not shown) for storing the communication identifiers of the communication terminals Tji-k that are associated with it (for example their telephone numbers or Internet addresses).

According to the invention, each communication equipment Sk is dedicated to managing the setting up of calls between calling and called users belonging to the same private subnetwork ENk or to different private subnetworks. It is associated with a communication identifier within the communication network that enables it to be connected to another communication equipment Sk'. Here, the communication network being an Internet/IP network, the communication identifier of an equipment Sk is an Internet address domain, for example.

The word "domain" must be understood in the context of the Internet. It therefore represents a set of entities ("user agent", proxy) belonging to the same functional community.

Because the terminals Tji-k of the users Uj-k of a private subnetwork ENk are logically connected to an assistant Dj-k, they are also logically connected to the equipment Sk including said assistants Dj-k.

It is important to note that a user terminal, such as a computer, for example, may equally constitute a communication equipment in the sense of the invention.

Each communication equipment Sk also includes a transfer module MTk, also known as a homepage and security module. The assistants Dj-k and the transfer module MTk constitute the management means Dj-k, MTk of the communication equipment Sk responsible, each time that they receive from one of their users Uj-k a request to set up a call to a called user Uj'-k' (where k' may be equal to k), for constituting an interrogation message to be sent to the equipment Sk' associated with that user Uj'-k', so that it asks him if he will accept the call.

To this end, the management means Dj-k, MTk begin by accessing a first memory Ml in which are stored first tables of the correspondences between first user identifiers Uj-k and second user identifiers Dj-k, to determine the second identifier that corresponds to the previously received first identifier of the called user. These first tables are, for example, personal directories associated with each of the users, general directories of the company (in the case of a business network), and directories of the user contacts of the company or of users having a personal directory. Its secondary identifier preferably also designates the business (or a public or private network) to which the associated user belongs.

The first memory M1 preferably constitutes a first portion of an information database Bk dedicated to the various directories cited above. This information database Bk is preferably installed in the private subnetwork ENk and connected to its communication equipment Sk. Of course, some of the directories could be stored in a memory of each assistant. This could in particular be the case of the personal directory and the directories of the usual contacts of the user associated with the assistant.

A second identifier is what is usually called a unique or universal personal identifier (UPI), for example, or a unique or universal communication identifier (UCI) linked to the user and therefore to his assistant. To simplify the description, it is considered hereinafter that a second identifier designates a user and the associated assistant.

Once in possession of the secondary identifier of the called user, the management means Dj-k, MTk access a second memory M2 in which is stored a second table of the correspondences between second user identifiers Dj-k and communication identifiers of communication equipments Sk, in order to determine the communication identifier of the communication equipment Sk' to which is connected the assistant Dj'-k' designated by the second identifier previously determined.

This second table of correspondences is, for example, a company directory (in the case of a business network) in which each of the businesses (or each of the various sites of the various businesses) is stored in corresponding relationship to its communication identifier (here an Internet domain, for example "@ccc.alcatel.com").

The second memory M2 preferably constitutes a second portion of the information database Bk dedicated to the company's directories.

The management means Dj-k, MTk then transmit over the Internet/IP network to the communication equipment Sk' whose communication identifier has just been determined an interrogation message including the communication identifier of their own equipment Sk and the second (and/or first) identifier of the calling user Uj-k, indicating to it that the assistant Dj-k of the caller Uj-k wishes to set up a call to the assistant Dj'-k' of the called party Uj'-k' (designated by his second identifier and/or his first identifier).

To go into this in more detail, if a calling user (for example user U1-1) wishes to set up a call to a called user (for example user U3-2), he sends the first identifier of the called user U3-2 to one of its terminals T1i-1. This is effected by means of the man/machine interface of the terminal T1i-1, for example by voice command, by activation of a dedicated key or by making a selection from a dedicated menu. The terminal T1i-1 is then configured to send the first identifier received to its assistant D1-1. The connection to the assistant D1-1 is effected by means of a communication link (at a predefined communication address of the private subnetwork EN1).

The assistant D1-1 then determines, in the first memory M1, as indicated above, the second identifier of the called user U3-2 associated with the first identifier received (designating the called user U3-2).

The assistant D1-1 then generates an interrogation request including the second identifier of the caller (U3-2) and requesting the setting up of a call to the assistant D3-2 designated by the second identifier of the called party previously determined. It then communicates this request to the transfer module MT1 with which it is associated, in order for the latter to determine in the second memory M2 the communication identifier of the equipment S2 corresponding to the second identifier of the called user U3-2, as indicated above.

Finally, the transfer module MT1 sends over the Internet/IP network to the communication equipment S2 an interrogation message including the communication identifier of its own equipment S1 and the second identifier of the caller, indicating to it that said assistant D1-1 of the caller U1-1 wishes to set up a call to the assistant D3-2 of the called party U3-2.

This call between assistants Dj-k is intended to determine if the setting up of a call between one of the terminals T1i-i of the calling user U1-1 and one of the terminals T3i'-2 of the called user U3-2 is likely to enable the calling user U1-1 and the called user U3-2 to exchange data given their respective accessibility states.

To enable this to be determined, each assistant Dj-k preferably includes a third memory M3 containing information data on its user or users Uj-k. Accordingly, the information data may represent one or more communication addresses (or communication identifiers) of terminals associated with the user Uj-k, and if possible representing each communication address of each communication terminal associated with the user Uj-k. Each terminal address (telephone number, electronic ("e-mail") address, URL or the like) is stored in the third memory M3 in corresponding relationship to a state that specifies at all times whether said terminal can be "accessed" by the associated user Uj-k. In other words, by consulting the third memory M3, the assistant can find out at any time which terminal Tji-k can be used to contact its user Uj-k.

Each third memory M3 can also contain other information data and in particular data representing the user Uj-k, such as the names of the persons he usually calls, for example, the type of terminal that he generally prefers to use to exchange data or information, where applicable as a function of their type, or his usual times of being at the office, and so on.

The third memory M3 preferably constitutes a third portion of the information database Bk divided into subportions each associated with a user Uj-k. However, each assistant could include its own "third" memory for storing the information data associated with its user.

Moreover, the terminal determination process may also take account of one or more criteria (or of information data) that is supplied by the calling user Uj-k at the same time as its call set-up request and/or predefined (or programmed). Of the criteria that may be used, there may in particular be cited the level (or degree) of urgency of the call, the type of call (text data, picture data, sound data, multimedia data, etc.), the cost of the call and the location of the called user Uj'-k'. For example, each communication equipment Sk is connected to a location server SL-k of the private subnetwork ENk to which it belongs, as shown in the figure. Because the assistants Dj-k are associated with users Uj-k attached to a business, they can be configured to assign priority systematically to a call set-up request from the caller whose hierarchical position within the business is the highest, for example.

The information data enables the assistant of the caller (here assistant D1-1) to integrate auxiliary data into its interrogation request and send the data to the assistant of the called party (here assistant D3-2) inside the interrogation message. To transmit this interrogation message, as for other messages exchanged between the two communication equipments Sk and Sk', the assistant uses a protocol allowing the transmission of free text, i.e. a protocol that does not impose the use of character strings that are fixed once and for all. The protocol for exchanging information between the two communication equipments Sk and Sk' preferably further enables the association with the free text contained in a given message of at least one auxiliary file of another type, for example a photo, video, sound, etc. file. For example, the protocol can use a language from the XML family of languages, in particular the language HTML.

The protocol itself is a function of the type of network connecting the two communication equipments Sk and Sk':

If it is an Internet type network (as in the embodiment shown in the figure), the equipment S2 associated with the called user U3-2 receives the interrogation message from the Internet/IP network in its transfer module MT2. The transfer module MT2 then sends the call set-up request ("D1-1 wishes to call D3-2") and any auxiliary data that it contains to the assistant of the called party D3-2 designated by the second identifier contained in the received interrogation message.

On receiving the request, the assistant of the called party D3-2 preferably begins by determining the first identifier of the called user U3-2. For this purpose, it accesses the first table of correspondences stored in the first memory M1. It then accesses the location server to determine the accessibility state of the called user U3-2.

If the called user U3-2 cannot be contacted, the assistant D3-2 sends a message indicating that it is impossible to set up a call to the assistant D1-1 of the caller U1-1 via the transfer modules MT2 and MT1 of the Internet/IP network. The assistant D1-1 is preferably adapted to inform the calling user U1-1 that the called user U3-2 cannot be contacted in this case.

If the called user U3-2 can be contacted, but on a terminal that does not meet the criteria transmitted with the interrogation message, the assistant D3-2 sends the assistant D1-1 of the caller U1-1 via the transfer modules MT2 and MT1 and the Internet/IP network a message reporting that it is impossible to set up a call satisfying the requested criteria, but that the user can nevertheless be contacted at another terminal satisfying other criteria, for example in the case of an emergency or in the case of a strictly private or strictly business call.

If the called user U3-2 can be contacted on at least one terminal satisfying any applicable criteria, the assistant D3-2 selects one of its terminals T3$i$'-2 as a function of the associated information data and any auxiliary data that accompanies the request. The purpose of this selection is to determine a terminal likely to enable the called user to be contacted immediately to ask if he will accept a call from the calling user U1-1 designated by the second identifier of his assistant D1-1 contained in the received message.

The assistant of the called party D3-2 then sends to the terminal of the caller (for example his mobile telephone T33-2), which it has just determined, an interrogation request adapted to its type and asking the called user U3-1 if he will accept the setting up of a call with the calling user U1-1. This can be done with the aid of a voice message or a text message of SMS or equivalent type. To enable the transmission of this message, each communication equipment Sk may be connected to one or more data servers SD-k, such as a voice server, for example, an "e-mail" server or a facsimile server, as shown in the figure.

If the called user U3-2 does not answer, and if he has another terminal, for example a fixed telephone T32-2, the assistant D3-2 attempts to contact him on the other terminal. If the called user does not have another terminal, or if the called user does not answer at that other terminal either, the assistant D3-2 sends a message reporting that it is impossible to set up a call to the assistant D1-1 of the caller U1-1 via the transfer modules MT2 and MT1 and the Internet/IP network. The assistant D1-1 is preferably adapted to report to the calling user U1-1 that the called user U3-2 cannot be contacted in this case.

If he wishes to respond to the interrogation request, the called user U3-2 uses the man/machine interface of his terminal. As indicated above, this can be effected by voice command, activating a dedicated key or making a selection in a dedicated menu. This response can be accompanied by information data defining a choice, a choice criterion or a condition, for example, to select a terminal other than that which received the interrogation request as a function of the preferences of the user vis à vis a plurality of terminals.

When the assistant D3-2 receives the response message from the selected called terminal, it analyzes its content. In the event of refusal of call set-up or in the event of absence of the called user, the assistant D3-2 sends a message reporting that it is impossible to set up a call to the assistant D1-1 of the caller U1-1 via the transfer modules MT2 and MT1 and the Internet/IP network. The assistant D1-1 is preferably adapted to report to the calling user U1-1 that the called user U3-2 cannot be contacted in this case.

In the event of acceptance of the call, including acceptance subject to specified condition(s), the assistant D3-2 of the called party U3-2 accesses the third memory M3 to determine the called user terminals and the calling user terminals that will be able to communicate, given information data associated with the called user and/or the calling user and/or auxiliary data (for example criteria or choices) contained in the response message that it has just received from the called user and/or in the original interrogation request.

In a first embodiment, the assistant D3-2 of the called party U3-2 sends the associated transfer module MT2 a response message indicating the communication identifier of at least one terminal of the called user U3-2, for example a fixed telephone number, a mobile telephone number or an Internet address.

In a second embodiment, which is preferred, the assistant D3-2 of the called party U3-2 sends the associated transfer module MT2 a response message indicating the communication identifier of at least one terminal of the called user U3-2 and an indication of one or more possible communication modes for each terminal identifier, for example narrow-band voice, wide-band voice or videophone, with a specified bit rate.

The terminal previously selected to submit the interrogation request to the called user U3-2 is not necessarily included in the terminals determined for the call finally set up.

The transfer module MT2 sends the response message to the communication equipment S1 associated with the calling user U1-1 via the Internet/IP network.

When it receives the response message via its transfer module MT1, the communication equipment S1 associated with the calling user U1-1 sends it to the assistant D1-1 designated by the second identifier contained in said response message. The assistant D1-1 determines the communication identifier of the terminal or terminals of the called user U3-2 and the possible communication mode or modes. As a function of this information and information specific to the calling user, it makes a choice between the various terminal identifiers of the called user. For example, if the wide-band voice communication mode and the video communication mode are possible, and if the calling user U1-1 has indicated that he prefers the videophone communication mode over the voice mode, then the assistant selects the videophone communication mode and therefore selects the terminal identifier associated with the videophone mode from the terminal identifiers of the called user and selects the terminal identifier associated with the videophone mode from the terminal identifiers of the calling user.

The assistant D1-1 then initiates the setting up of a call between the selected two terminals. The assistant D1-1 preferably makes a third party responsible for setting up a direct call between these terminals. In the present context the expression "third party" refers to the communication network (PLMN, PSTN, Internet, private network, etc.) selected for setting up directly the call between the calling and called terminals. To this end, it extracts from its memory the communication identifier of the selected terminal of the caller and then communicates that identifier to the third party together with that of the terminal of the called party, which is contained in the received response message.

However, it could be envisaged that one or both of the assistants assume responsibility for setting up the call. In this case, they exchange signaling messages.

An assistant Dj-k can provide many other functions, and in particular:

analyzing common or personal databases (specific to the user Uj-k or to other users Uj'-k subject to authorization);

analyzing a request from calling user Uj-k at the request of its assistant Dj-k in order to process it and then to send an appropriate response to said user Uj-k;

processing notifications (messages or requests for location of its user Uj-k);

updating itself from other assistants Dj'-k so as to store, preferably in a confidential manner (i.e. in a manner that is not accessible to the user Uj-k), information relating to the users Uj'-k associated with the assistants Dj'-k (for example lists of their communication terminals, their habits in terms of the terminal type they use or their respective usual locations as a function of the day and/or the time of day, and the like);

determining from the other assistants Dj'-k the coordinates (communication identifier, function, e-mail address, geographical location, postal address, etc.) of a user wishing to contact its user Uj-k and that are unknown to it;

reporting to the other assistants Dj'-k that a user is no longer responding at the communication addresses that were associated with him, that a user has no assistant, or that the assistant of a user is located in his computer, in his mobile telephone, in a server or in any other communication terminal, to enable automatic updating of the information of all the assistants;

locating its user Uj-k thanks to auxiliary data delivered by external means, such as passage sensors and activity detectors at the level of one or more terminals; in fact it is possible to recover certain location information, for example on passing through a gate (or a doorway) using an access card or an identifying badge with a Bluetooth interface, or on opening up or shutting down a communication terminal, etc., in order to determine the accessibility state of the user. This location information is stored in the location server SL-k, for example.

Furthermore, an assistant Dj-k preferably has a man/machine interface in order to be able to exchange data of any type and in any form (electrical signals, data, voice, pictures, etc.) with an internal or external user terminal.

Moreover, an assistant Dj-k preferably has access (in read/write, send/receive or activate/deactivate mode) to all the terminals and/or to the real or virtual entities (terminals, audio and/or video message boxes, or electronic (e-mail) mailboxes).

Finally, the assistants are adapted to determine the state of telephones of any type ("functional mode", such as SIP telephones, for example, and "stimuli mode"). Thus an assistant Dj-k can take control of an SIP telephone during its connection to the network via an 802.3 or 802.11 type connection. When an SIP telephone connects to the network, it executes a sequence of tasks to identify itself to the network and to obtain information such as an IP address, a VLAN number and the like, and is functionally connected to an assistant, which therefore becomes its main correspondent. It then manages for it, with other parties, the exchanges intended to set up a call.

It is generally advantageous for an assistant Dj-k to be able to behave like an "expert system" which enriches itself over time through a learning process and/or through the acquisition of information data in its environment and in the environment of other assistants with which it communicates and/or by integrating new services or new functions. This kind of behavior can be implemented through "expert" techniques associated with databases and semantic tables assigned specifically to each assistant, for example.

Of course, it may also be envisaged that the processing devices (or assistants) Dj-k are not of adaptive type.

As indicated above, the transfer module MTk is preferably responsible for providing a homepage function and a security function, which are often linked.

The transfer module homepage function is more specifically responsible, on the one hand, for directing messages coming from an external communication equipment (in particular an assistant) or an external user to the assistant or user concerned, associated with its own communication equipment, and for informing external correspondents (assistants and users) of its own (internal) assistants and users. For example, in the event of a request for information, the transfer module MTk can offer a homepage offering a choice of actions, such as searching for a correspondent on the basis of keywords (name, function, department/division, site, etc.).

Moreover, the transfer module MTk is preferably connected to the various data servers SDk of its parent private subnetwork ENk in order to be able to dialog appropriately with any type of external communication terminal. Accordingly, if an external user having no assistant uses his mobile telephone to set up a call or to request information, for example, the transfer module MTk can establish a direct dialog with that user via text to speech (TTS) or speech to text (STT) type communication systems. These TTS and STT systems associated with appropriate software applications thus make it possible to offer the external user an assistant function that he himself does not have.

The transfer module MTk security function is more specifically responsible for verifying if an external correspondent (assistant or user) is authorized to set up a call to one of its own assistants and users. To this end, using appropriate software application means, the transfer module MTk verifies the format and the consistency of the information received from the network. Moreover, this function is responsible for requesting complementary information from an external correspondent should it deem this to be necessary. This complementary information is also subject to analysis as a function of security criteria and/or rules.

The behavior of these two functions varies in accordance with the information received from external correspondents.

A few non-exhaustive examples of the use of assistants D within an installation of the type shown in the single figure are described next.

Each of the situations described hereinafter is initiated by the user U1-1, who is in his office and working on his laptop computer T11-1. It is therefore through the intermediary of an equipment coupled to that computer T11-1, for example a microphone (or the keyboard or the mouse), that the user U1-1 indicates that he wishes to access his assistant D1-1, for example by speaking the word "assistant" (or by supplying the communication address of the assistant).

In a first example, the user U1-1 requests his assistant D1-1 to contact the user U2-2 in order to send him multimedia data, without this being deemed to be urgent. In this example, it is assumed that the laptop computers T11-1 and T22-2 of the users U1-1 and U2-2 are equipped to exchange multimedia data. This request is effected orally, for example, by saying "Multimedia call to U2-2".

The man/machine interface of the laptop computer T11-1 converts this request into data usable by the assistant D1-1, which then sets up a connection with the assistant D2-2 of the designated user U2-2 via the transfer modules MT1 and MT2 and the Internet/IP network to send it the request, for example in the form [U1-1, multimedia, normal priority, only if user U2-2 is in his office].

On receiving this request, the assistant D2-2 interrogates the presence server of its private subnetwork EN2 to determine where its user U2-2 is located and which terminal can be used to contact U2-2. In this example, it is assumed that the user U2-2 is in his office and that he is working on his laptop computer T22-2 (which is adapted to exchange multimedia data).

For example, the assistant D2-2 can then send a message to the user U2-2 (in the form of text or synthesized voice) on his laptop computer T22-2 to inform him of the call and to ask him whether he will accept the call or not.

Assuming that the user U2-2 informs his assistant D2-2 that he will accept the call, the assistant D2-2 sends a message to the assistant D1-1 via the transfer modules MT2 and MT1 and the Internet/IP network, for example a message of [accept, multimedia, laptop computer T22-2] type.

The assistant D1-1 then initiates setting up the connection between the laptop computers T11-1 and T22-2 via the proxy access server S2.

In a second example, the user U1-1 also requests its assistant D1-1 to contact the user U2-2 to send him multimedia data, without this being deemed to be urgent. In this example, it is assumed that the laptop computers T11-1 and T22-2 of the users U1-1 and U2-2 are equipped to exchange multimedia data, but that only the laptop computer T11-1 is turned on (T22-2 is turned off).

The man/machine interface of the laptop computer T11-1 converts this request into data usable by the assistant D1-1, which then sets up a connection with the assistant D2-2 of the designated user U2-2 via the transfer modules MT1 and MT2 and the Internet/IP network to send him the request, for example in the form [U1-1, multimedia, normal priority, only if user U2-2 is in his office].

On receiving this request, the assistant D2-2 interrogates the presence server of its private subnetwork EN2 to determine where its user U2-2 is located and which terminal can be used to contact him. In this example, it is assumed that the user U2-2 is in his office and that his laptop computer T22-2 is turned off, as indicated above. Consequently, the user U2-2 can be contacted only by his mobile telephone T21-2.

The assistant D2-2 then sets up a call to the mobile telephone T21-2 in order to indicate to its user U2-2 that the user U1-1 wishes to set up a multimedia call to him, for example by means of a synthesized voice message or an SMS text message (or by sending a fax). If the user U2-2 agrees to turn on his laptop computer T22-2, the assistant D2-2 sends the assistant D1-1 a message of [accept, multimedia, laptop computer T22-2] type, for example.

The assistant D1-1 then initiates setting up the connection between the laptop computers T11-1 and T22-2.

In a third example, the user U1-1 requests its assistant D1-1 to contact the user U2-2 in order to send him multimedia data without this being deemed to be urgent. In this example, it is assumed that the laptop computers T11-1 and T22-2 of the users U1-1 and U2-2 are equipped to exchange multimedia data but that only the laptop computer T11-1 is turned on (the laptop computer T22-2 is turned off).

The man/machine interface of the laptop computer T11-1 converts this request into data usable by the assistant D1-1, which then sets up a connection to the assistant D2-2 of the designated user U2-2 via the transfer modules MT1 and MT2 and the Internet/IP network, to send it the request, for example in [U1-1, multimedia, normal priority, only if user U2-2 is in his office] form.

On receiving this request, the assistant D2-2 interrogates the presence server of its private subnetwork EN2 to determine where its user U2-2 is located and which terminal can be used to contact him. In this example, it is assumed that the user U2-2 is traveling and that he can be contacted only on his mobile telephone T21-2 and provided that the call is an urgent business call.

The assistant D2-2 then informs the assistant D1-1 that the user U2-2 cannot be contacted, knowing that he is absent from his office. The conditions set by the caller were [U1-1, multimedia, normal priority, only if user U2-2 is in his office].

The assistant D1-1 immediately informs the user U1-1 of the above, for example by a synthesized voice message or a text message. Then, if the user U1-1 indicates to its assistant D1-1 that the call is an urgent business call, the assistant D1-1 initiates a new request to communicate with the user U2-2.

Each communication equipment Sk, and in particular its processing devices Dj-k and its processing module MTk, may be implemented in the form of electronic circuits (hardware), software or data processing modules (software) or a combination of circuits and software.

The invention is not limited to the communication equipment embodiments described above by way of example only, but encompasses all variants that the person skilled in the art might envisage that fall within the scope of the following claims.

Thus the above description refers to a communication installation including a private network, belonging to a business or to a group of businesses, divided into a plurality of private subnetworks and connected to an Internet/IP type network and to one or more telephone networks. However, the invention concerns generally all types of public or private networks that are interconnected.

Moreover, there has been described an application in which the terminals are fixed or laptop computers and fixed or mobile telephones. However, the invention concerns generally all fixed or portable machines capable of exchanging data (of multimedia, voice, picture or text type) with a communication network (of any type), including facsimile machines and personal digital assistants (PDA).

Moreover, there has been described an installation in which each user is associated with a processing device (or assistant). However, the invention applies equally to the situation in which a processing device is shared by a plurality of users.

Moreover, examples have been described in which a calling user attempted to contact a single called user. However, the invention applies equally to situations in which a calling user attempts to contact a plurality of called users. In this case, negotiation is effected between the various communication equipments associated with the users concerned.

Finally, an embodiment of the invention has been described in which the called user was originally designated by a first identifier from which there was determined, in a first memory, a second identifier also representing the called user. However, the invention applies equally to situations in which the called user is designated directly by a second identifier. In this case, the communication address of the communication equipment to which the terminals of the called user are connected is deduced directly from the (second) memory. The first and second identifiers can even be the same. In this case, there may be provided only a (second) memory in which is stored a table of the correspondences between (first or second) user identifiers and communication equipment communication addresses. There may also be envisaged a variant in which the first and second tables of correspondences are merged into a single table of correspondences, the communication addresses of the communication equipments being then accessed from the designation of a first and/or a second user identifier.

The invention claimed is:

1. A method of setting up calls between calling users (Uj-k) and called users (Uj'-k') each associated with at least one personal identifier and each having at least one communication terminal (Tji-k), each communication terminal of the calling user (Uj-k) being logically connected to a first communication equipment (Sk) and each communication terminal of the called user (Uj'-k') being logically connected to a second communication equipment (Sk') and the combination of these terminals enabling a plurality of modes of communication between these two users; the method comprising, in the event of a request to set up a call between a calling user (Uj-k-) and a called user (Uj'-k'):

exchanging information between the first communication equipment (Sk) and the second communication equipment (Sk') prior to setting up a call, and, if the called user accepts the setting up of a call:

the second communication equipment (Sk') determining each terminal of the called user that would enable setting up of the requested call;

the second communication equipment (Sk') then sending the first communication equipment (Sk) a terminal identifier for each terminal thus determined; and the first communication equipment (Sk) then selecting, from the identifiers of the called user that it receives, at least one terminal identifier, if there is a plurality of possible choices, and then initiating the setting up of a call between at least one terminal of the calling user and at least one terminal of the called user corresponding to an identifier that it has selected.

2. The method according to claim 1, wherein, for each terminal that it has determined, the second communication equipment (Sk') further determines each communication mode of this terminal, that would enable setting up of the requested call;

the second communication equipment (Sk') then further sends the first communication equipment (Sk) a communication mode identifier for each mode determined in this way; and the first communication equipment (Sk) then selects, from the identifiers of the called user that it receives, at least one terminal identifier and at least one communication mode identifier, if there is a plurality of possible choices.

3. The method according to claim 1, wherein the first communication equipment (Sk) selects at least one terminal identifier of the called user taking account of predetermined information data associated with the calling user.

4. The method according to claim 1, wherein the first communication equipment (Sk) selects at least one terminal identifier of the called user taking account of information data coming from the calling user.

5. The method according to claim 1, wherein the first communication equipment (Sk) selects at least one terminal identifier of the called user taking account of predetermined information data associated with the called user.

6. The method according to claim 1, wherein the first communication equipment (Sk) selects at least one terminal identifier of the called user taking account of information data coming from the called user.

7. The method according to claim 2, wherein the first communication equipment (Sk) selects at least one terminal identifier of the called user, and at least one communication mode identifier if there is a plurality of possible choices, taking account of predetermined information data associated with the calling user.

8. The method according to claim 2, wherein the first communication equipment (Sk) selects at least one terminal identifier of the called user, and at least one communication mode identifier if there is a plurality of possible choices, taking account of information data coming from the calling user.

9. The method according to claim 2, wherein the first communication equipment (Sk) selects at least one terminal identifier of the called user, and at least one communication mode identifier if there is a plurality of possible choices, taking account of predetermined information data associated with the called user.

10. The method according to claim 2, wherein the first communication equipment (Sk) selects at least one terminal identifier of the called user, and at least one communication mode identifier if there is a plurality of possible choices, taking account of information data coming from the called user.

11. The method according to claim 1, wherein the second communication equipment (Sk') determines each terminal of the called user that would enable setting up of the requested call taking account of predetermined information data associated with the called user.

12. The method according to claim 1, wherein the second communication equipment (Sk') determines each terminal of the called user that would enable setting up of the requested call taking account of information data coming from the called user.

13. The method according to claim 1, wherein the second communication equipment (Sk') determines each terminal of the called user that would enable setting up of the requested call further taking account of predetermined information data associated with the calling user.

14. The method according to claim 1, wherein the second communication equipment (Sk') determines each terminal of the called user that would enable setting up of the requested call further taking account of information data coming from the calling user.

15. The method according to claim 2, wherein the second communication equipment (Sk') determines each terminal of the called user and each communication mode of this terminal which would enable setting up of the requested call taking account of predetermined information data associated with the called user.

16. The method according to claim 2, wherein the second communication equipment (Sk') determines each terminal of the called user and each communication mode of this terminal that would enable setting up of the requested call taking account of information data coming from the called user.

17. The method according to claim 2, wherein the second communication equipment (Sk') determines each terminal of the called user and each communication mode of this terminal which would enable setting up of the requested call further taking account of predetermined information data associated with the calling user.

18. The method according to claim 2, wherein the second communication equipment (Sk') determines each terminal of the called user and each communication mode of this terminal that would enable setting up of the requested call further taking account of information data coming from the calling user.

19. Communication equipment (Sk) for managing the setting up of calls between calling users (Ui-k) and called users (Uj' k') each associated with at least one identifier and each having at least one communication terminal (Tji-k), this equipment being logically connected to each communication terminal of at least one user (Tji-k) and including:
 means (Dj-k) for exchanging information with a second communication equipment (Sk') analogous to the first before setting up a call between a terminal (Tji-k) logically connected to this first equipment and another terminal (Tji-k) logically connected to this second equipment (Sk'),
 and wherein the means (MT) for exchanging information with a second communication equipment (Sk') analogous to the first include:
 means for receiving a terminal identifier for each terminal of a called user that would enable setting up of the requested call; and
 means for then selecting from the identifiers of the called user that it receives at least one terminal identifier, if there is a plurality of possible choices, and then initiating the setting up of a call between at least one terminal of the calling user and at least one terminal of the called user corresponding to a selected identifier.

20. The communication equipment (Sk) according to claim 19, wherein the means (Dj-k) for exchanging information with a second communication equipment (Sk') analogous to the first further include:
 means for receiving at least one communication mode identifier for each terminal determined by the second telecommunication equipment; and
 means for selecting from the identifiers of the called user that it receives at least one terminal identifier and at least one communication mode identifier if there is a plurality of possible choices.

21. The communication equipment (Sk) according to claim 19, wherein the means for selecting from the identifiers of the called user that it receives at least one terminal identifier include means for taking account of predetermined information data associated with the calling user.

22. The communication equipment (Sk) according to claim 19, wherein the means for selecting from the identifiers of the called user that it receives at least one terminal identifier include means for taking account of information data coming from the calling user.

23. The communication equipment (Sk) according to claim 19, wherein the means for selecting from the identifiers of the called user that it receives at least one terminal identifier include means for taking account of predetermined information data associated with the called user.

24. The communication equipment (Sk) according to claim 19, wherein the means for selecting from the identifiers of the called user that it receives at least one terminal identifier include means for taking account of information data coming from the called user.

25. The communication equipment (Sk) according to claim 20, wherein the means for selecting from the identifiers of the called user that it receives at least one terminal identifier and at least one communication mode identifier include means for taking account of predetermined information data associated with the calling user.

26. The communication equipment (Sk) according to claim 20, wherein the means for selecting from the identifiers of the called user that it receives at least one terminal identifier and at least one communication mode identifier include means for taking account of information data coming from the calling user.

27. The communication equipment (Sk) according to claim 20, wherein the means for selecting from the identifiers of the called user that it receives at least one terminal identifier and at least one communication mode identifier include means for taking account of predetermined information data associated with the called user.

28. The communication equipment (Sk) according to claim 20, wherein the means for selecting from the identifiers of the called user that it receives at least one terminal identifier and at least one communication mode identifier include means for taking account of information data coming from the called user.

29. The communication equipment (Sk) according to claim 19, wherein the means (Dj-k) for exchanging information with a second communication equipment (Sk') analogous to the first, if a user of this first equipment is called, include means for determining each terminal of the called user that would enable setting up of the requested call taking account of predetermined information data associated with the called user or of information data coming from the called user.

30. The communication equipment (Sk) according to claim 19, wherein the means (Dj-k) for exchanging information with a second communication equipment (Sk') analogous to the first, if a user of this first equipment is called, include means for determining each terminal of the called user that would enable setting up of the requested call taking account of predetermined information data associated with the called user.

31. The communication equipment (Sk) according to claim 19, wherein the means (Dj-k) for exchanging information with a second communication equipment (Sk') analogous to the first if a user of this first equipment is called include means for determining each terminal of the called user that would enable setting up of the requested call taking account of information data coming from the called user.

32. The communication equipment (Sk) according to claim 19, wherein the means for determining each terminal of the called user that would enable setting up of the requested call include means for further taking account of predetermined information data associated with the calling user.

33. The communication equipment (Sk) according to claim 19, wherein the means for determining each terminal of the called user that would enable setting up of the requested call include means for further taking account of information data coming from the calling user.

34. The communication equipment (Sk) according to claim 20, wherein the means (Dj-k) for exchanging information with a second communication equipment (Sk') analogous to the first if a user of this first equipment is called include means for determining each terminal of the called user and each mode of communication of that terminal that would enable setting up of the requested call taking account of predetermined information data that is associated with the called user.

35. The communication equipment (Sk) according to claim 20, wherein the means (Dj-k) for exchanging information with a second communication equipment (Sk') analogous to the first if a user of this first equipment is called include means for determining each terminal of the called user and each mode of communication of that terminal that would enable setting up of the requested call taking account of information data coming from the called user.

36. The communication equipment (Sk) according to claim 19, wherein said means (Dj-k) for exchanging information use a protocol allowing the transmission of free text.

37. The communication equipment (Sk) according to claim 36, wherein said means (Dj-k) for exchanging information use a language from the XML family of languages.

* * * * *